(12) United States Patent
McCarthy et al.

(10) Patent No.: US 9,111,338 B2
(45) Date of Patent: Aug. 18, 2015

(54) SYSTEM FOR REDUCING NOISE IN VIDEO PROCESSING

(71) Applicant: General Instrument Corporation, Horsham, PA (US)

(72) Inventors: Sean T. McCarthy, San Fracisco, CA (US); Vijay Kamarshi, Cupertino, CA (US); Amit Tikare, San Jose, CA (US)

(73) Assignee: ARRIS Technology, Inc., Suwanee, GA (US)

( * ) Notice: Subject to any disclaimer, the term of this patent is extended or adjusted under 35 U.S.C. 154(b) by 0 days.

(21) Appl. No.: 14/317,381

(22) Filed: Jun. 27, 2014

(65) Prior Publication Data

US 2014/0314335 A1    Oct. 23, 2014

Related U.S. Application Data

(63) Continuation of application No. 12/761,581, filed on Apr. 16, 2010, now Pat. No. 8,767,127.

(60) Provisional application No. 61/170,407, filed on Apr. 17, 2009.

(51) Int. Cl.
*H04N 5/00* (2011.01)
*G06K 9/40* (2006.01)
*G06T 5/00* (2006.01)
*H04N 5/213* (2006.01)

(52) U.S. Cl.
CPC ............. *G06T 5/002* (2013.01); *H04N 5/213* (2013.01); *G06T 2207/10016* (2013.01); *G06T 2207/20012* (2013.01)

(58) Field of Classification Search
CPC .................. G06T 5/002; H04N 5/213
See application file for complete search history.

(56) References Cited

U.S. PATENT DOCUMENTS 5,920,356 A * 7/1999 Gupta et al. .................. 348/606
2008/0118179 A1* 5/2008 Jeong et al. .................. 382/275

* cited by examiner

*Primary Examiner* — Jefferey Harold
*Assistant Examiner* — Sean Haiem
(74) *Attorney, Agent, or Firm* — Thomas A. Ward

(57) ABSTRACT

A system includes a data storage configured to store a model human visual system, an input module configured to receive an original picture in a video sequence and to receive a reference picture, and a processor. The processor is configured to create a pixel map of the original picture using the model human visual system. A first layer is determined from the pixel map. A weighting map is determined from a motion compensated difference between the original picture and the reference picture. A processed picture is then determined from the original picture using the weighting map and the first layer.

6 Claims, 11 Drawing Sheets

SYSTEM FOR REDUCING NOISE IN VIDEO PROCESSING

CLAIM OF PRIORITY

The present application is a continuation in part of U.S. patent application Ser. No. 12/761,581 filed Apr. 6, 2010 which claimed priority to U.S. Provisional Patent Application Ser. No. 61/170,407, filed on Apr. 17, 2009, entitled "Perceptual Video Processor."

BACKGROUND

The quality of a video image is ultimately determined by a human viewer of video image. Video noise includes significant energy (i.e., a significant number of bits) that does not contribute to the quality of the video image as determined by the human viewer of the video image. Video images containing video noise and difficult-to-track visual details are known to be determined to be of similar quality to similar video images without the video noise and difficult-to-track visual details. Thus, compression of video images for transmission or storage is impacted by both the video noise and the difficult-to-track visual details.

Reducing the energy or entropy of the video noise and difficult-to-track visual details will reduce the number of bits required to code video. However, it is difficult to accurately identify video noise and to accurately identify difficult-to-track visual details. In addition, if important details in the video image are removed, the end user will perceive a degradation in video quality. This degradation is known to include effects such as perceptual masking, in which interference from one perceptual stimulus decreases perceptual effectiveness of other perceptual stimulus.

SUMMARY

According to an embodiment, a system includes a data storage configured to store a model human visual system, an input module configured to receive an original picture in a video sequence and to receive a reference picture, and a processor. The processor is configured to create a pixel map of the original picture using the model human visual system. A first layer is determined from the pixel map. A weighting map is determined from a motion compensated difference between the original picture and the reference picture. A processed picture is then determined from the original picture using the weighting map and the first layer.

Also disclosed herein is a method of reducing noise in video processing, according to an embodiment. In the method, an original picture in a video sequence is received. A pixel map of the original picture is created using a model human visual system. A reference picture is received. A first layer is determined from the pixel map. A motion compensated difference between the original picture and the reference picture is determined. Thereafter, a weighting map is determined from the motion compensated difference between the original picture and the reference picture. The weighting map includes a value for each pixel based on a model of human temporal perceptibility. A processed picture is then determined from the original picture using the weighting motion compensated map and the first layer.

Still further disclosed is a computer readable storage medium on which is embedded one or more computer programs implementing the above-disclosed method of reducing noise in video processing, according to an embodiment.

Embodiments of the present invention provide auto adapting noise reduction and adaptive detail reduction functions for an encoding system. The embodiments of the invention may operate as either a stand-alone pre-processor or be coupled to the encoding engine. The embodiments of the invention combine both noise layer and a weighting map to find pixels that are difficult-to-compress and difficult-to-perceive and then reduces the energy of those pixels making video images easier to encode. Consequently, there are fewer bits to compress and transmit.

BRIEF DESCRIPTION OF THE DRAWINGS

Features of the present invention will become apparent to those skilled in the art from the following description with reference to the figures, in which.

DETAILED DESCRIPTION

For simplicity and illustrative purposes, the present invention is described by referring mainly to exemplary embodiments thereof. In the following description, numerous specific details are set forth to provide a thorough understanding of the present invention. However, it will be apparent to one of ordinary skill in the art that the present invention may be practiced without limitation to these specific details. In other instances, well known methods and structures have not been described in detail to avoid unnecessarily obscuring the present invention. In addition, different embodiments may be used in combination with each other.

Figure 1:
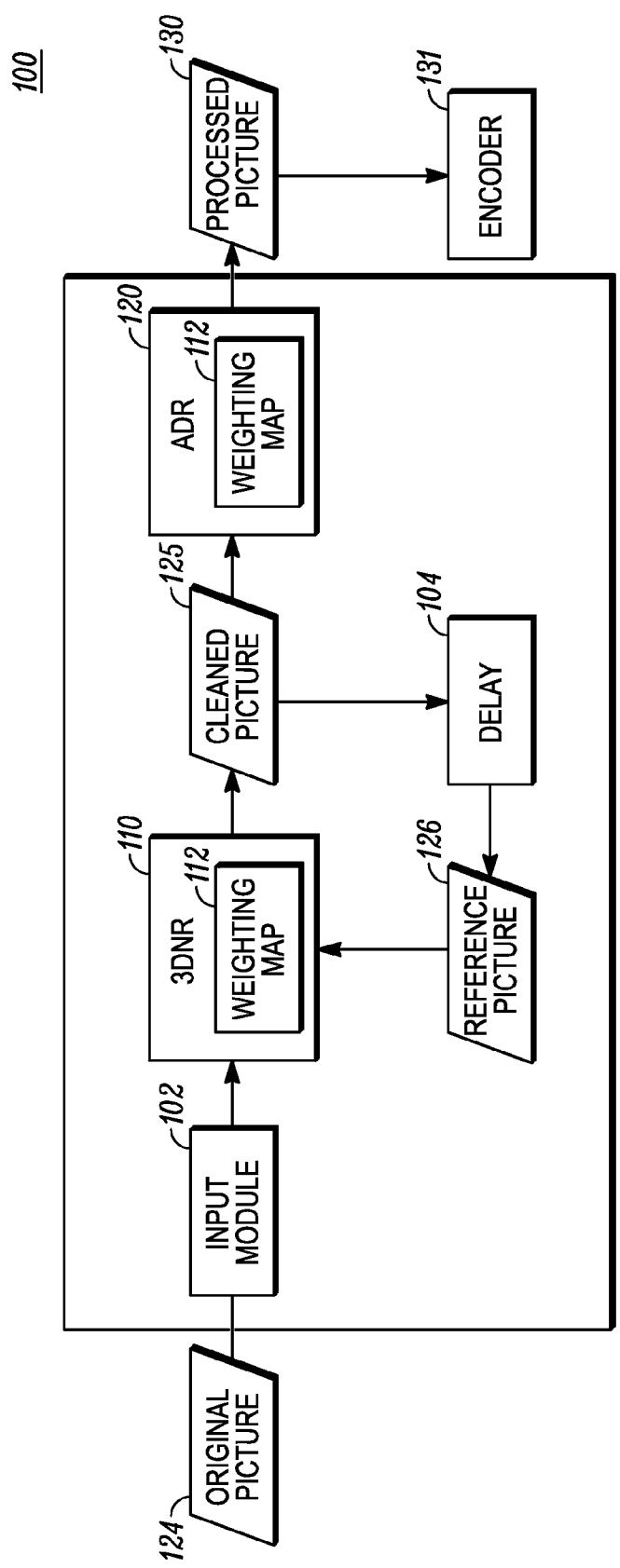
FIG. 1 illustrates a block diagram for a system for reducing noise in video processing, according to an embodiment.

FIG. 1 illustrates a block diagram of a system 100 for reducing noise in video processing, according to an embodiment. Noise is excess bits in a digital video image that are determined not to be needed for accurate human perception of the digital video image. The system 100 includes an input module 102, a three dimensional noise reducer (3DNR) 110 and an adaptive detail reducer (ADR) 120. The input module 102 is configured to receive an original picture 124 in a video sequence. The 3DNR performs three dimensional noise reduction on the original picture 124 in two spatial dimensions and a temporal dimension. The ADR 120 performs adaptive detail reduction on the original picture 124 on selected difficult-to-track details. It should be understood that the following description of the system 100 is but one manner of a variety of different manners in which such a system 100 may be configured and operated. In addition, it should be understood that the system 100 may include additional components and that some of the components described may be removed and/or modified without departing from a scope of the system 100.

The system 100 uses a weighting map 112 to form a processed picture 130 from the original picture 124. The weighting map 112 is created by the system 100 using a model of the human visual system that takes into account the statistics of natural images and the response functions of cells in the retina. The weighting map 112 is a pixel map of the original picture 124 based on the model of the human visual system. The weighting map 112 may include a value or weight for each pixel identifying a level of difficulty for visual perception and/or a level of difficulty for compression. The level of difficulty for compression may be a continuous scale measuring the number of bits needed to encode the pixel or area of the image. Similarly, the level of difficulty for visual perception is a continuous scale measuring the number of bits needed to encode the pixel or area of the image.

Different weighting maps 112 may be used in the 3DNR 110 and the ADR 120. For instance, the system 100 may be configured to use the weighting map 112 and the 3DNR 110 to reduce noise in the original picture 124 and thereby form the processed picture 130. Additionally or alternately, the system 100 may reduce difficult-to-track details in the original picture 124 using the weighting map 112 and the ADR 120 to form the processed picture 130. The difficult-to-track details may be determined using a predetermined threshold based on the weighting map 112.

Figure 4:
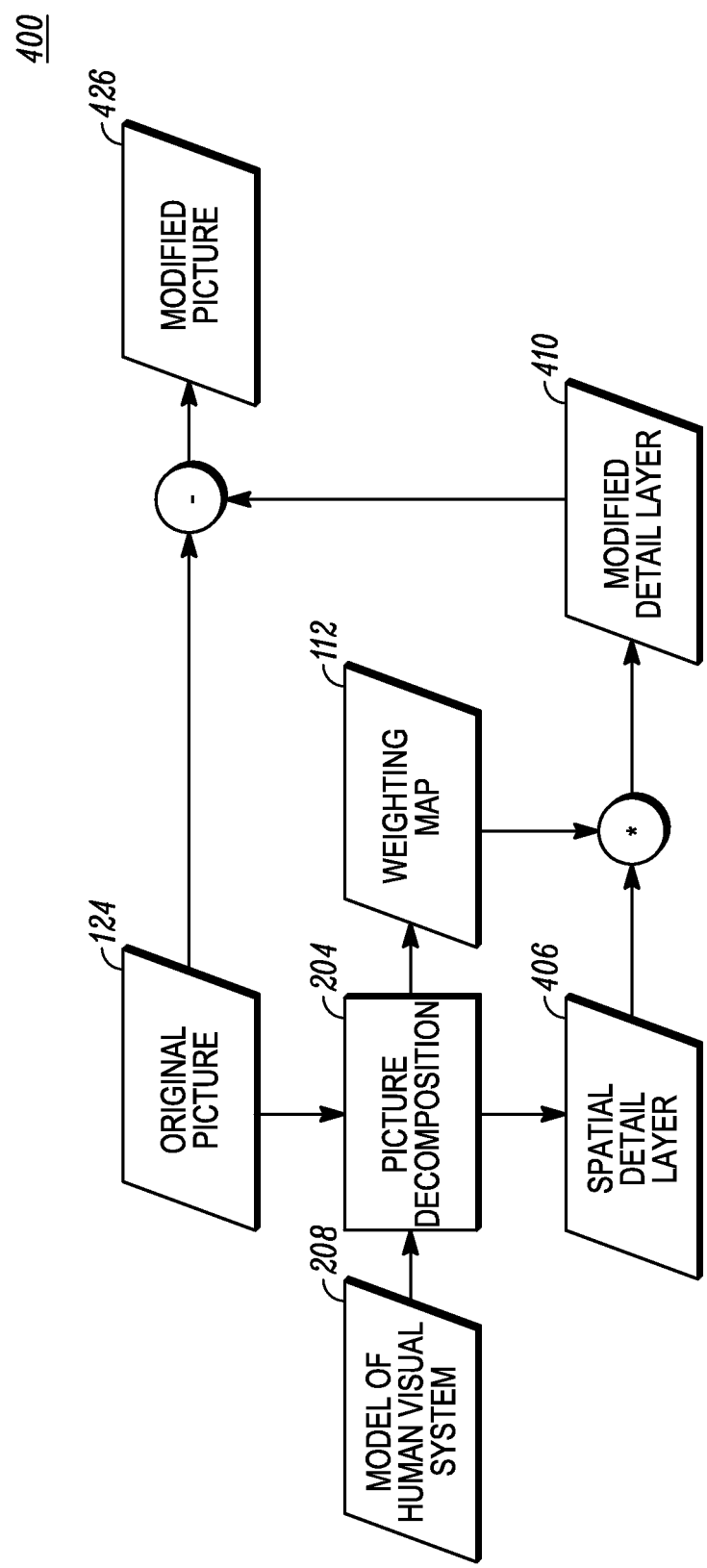
FIG. 4 shows a data flow diagram of an adaptive detail reducer, according to an embodiment.

The processed picture 130 may comprise a cleaned picture 125 after processing by the 3DNR 110 as described hereinbelow with respect to FIG. 2, a modified picture after processing by the ADR 120 as described hereinbelow with respect to FIG. 4, or a cleaned and modified picture after processing by the 3DNR 110 and the ADR 120. The cleaned picture 125 includes reduced amounts of noise while a modified picture includes reduced amounts of adapted details. The adapted details are important features, such as faces and edges that are preserved by the ADR 120 and are determined to be useful for perceiving the image.

The system 100 uses a reference picture 126 to clean or modify the original picture 124. According to an embodiment, the reference picture 126 may comprise a picture that has previously been processed by the system 100, for instance the cleaned picture 125 from a preceding original picture 124 in the video sequence. Alternately, the reference picture 126 may comprise an unprocessed picture.

The system 100 uses the information to selectively reduce noise and difficult-to-track details with minimal introduction of noticeable processing artifacts. In addition, processes used in the system 100 use the weighting map 112 to reduce and/or eliminate artifacts such as motion blur, motion discontinuities, and artificial-looking edges. The system 100 reduces perceptual masking and may be used to avoid smearing. The 3DNR 110 may be configured to extract a noise layer, thereby performing auto adapting noise reduction for the video sequence, and the ADR 120 may be used to extract a spatial layer, thereby performing adaptive detail reduction for the video sequence. The 3DNR 110 and the ADR 120 are fully separable and the system 100 may comprise a single 3DNR 110, the operation of which is described with respect to FIG. 2 hereinbelow, or a single ADR 120, the operation of which is described with respect to FIG. 4 hereinbelow.

Figure 2:
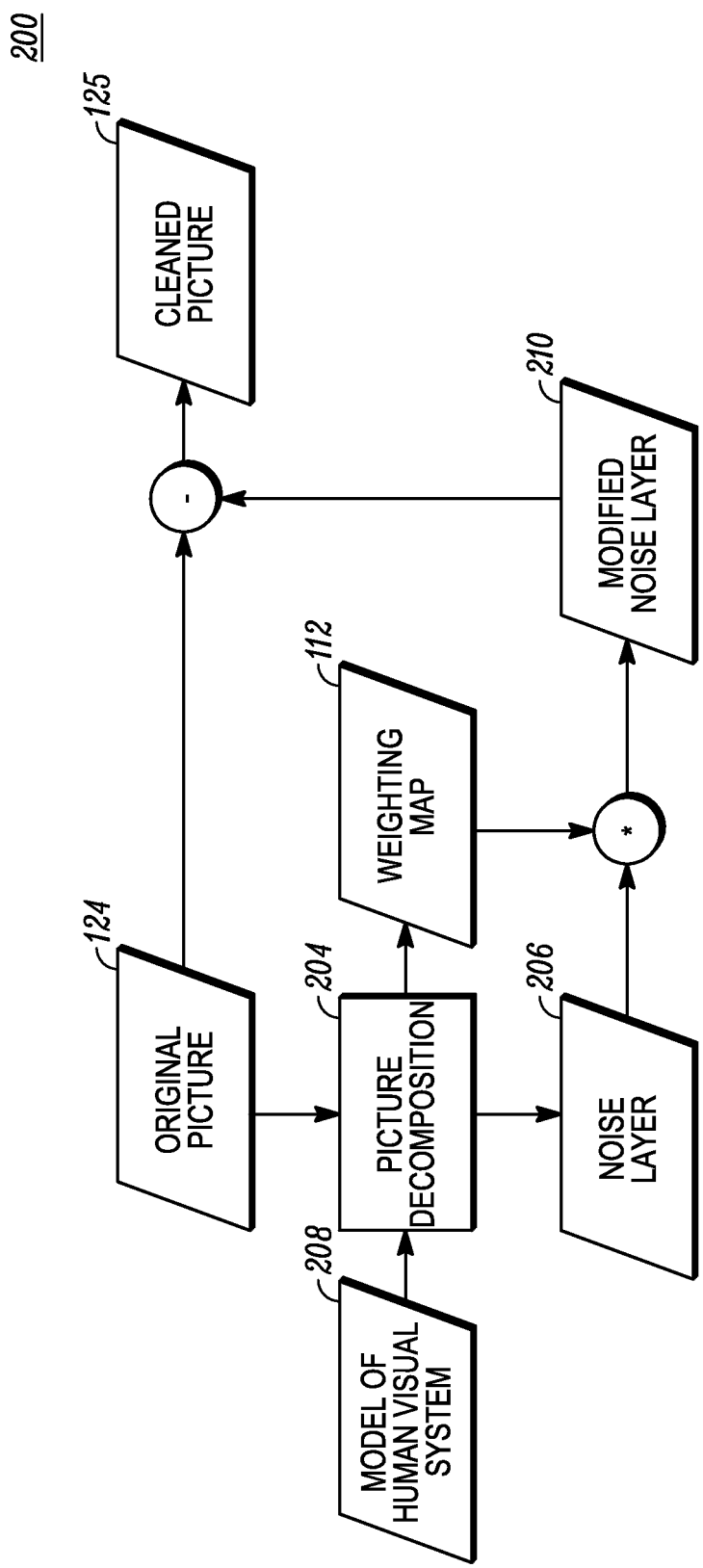
FIG. 2 shows a data flow diagram of a 3D noise reducer, according to an embodiment.

FIG. 2 illustrates a data flow diagram 200 for the 3DNR 110, according to an embodiment. The original picture 124 is decomposed using picture decomposition 204 into a noise layer 206 and a weighting map 112. The picture decomposition 204 uses the model human visual system 208 to determine a pixel map based on the original picture 124.

The model of the human visual system 208 may include a model of human spatial perceptibility and a model of human temporal perceptibility. According to an embodiment, the model of the human visual system used in creating the weighting map 112 is an integrated perceptual guide (IPeG) system, described in more detail in U.S. Pat. No. 6,014,468 entitled "Apparatus and Methods for Image and Signal Processing," issued Jan. 11, 2000, U.S. Pat. No. 6,360,021 entitled "Apparatus and Methods for Image and Signal Processing," issued Mar. 19, 2002, U.S. Pat. No. 7,046,857 entitled "Apparatus and Methods for Image and Signal Processing," a continuation of U.S. Pat. No. 6,360,021 issued May 16, 2006, and International Application PCT/US98/15767, entitled "Apparatus and Methods for Image and Signal Processing," filed on Jan. 28, 2000, which are incorporated by reference in their entireties. The IPEG system provides information including a set of signals that organizes visual details into perceptual significance, and a metric that indicates the ability of a viewer to track certain video details.

The noise layer 206 includes a value for each pixel based on the model of human spatial perceptibility. For instance, the noise layer 206 may be determined using Equation (1):

$$N(i,j)=E(i,j) \cdot P_N(i,j),$$

in which i, j are the pixel coordinates of the N pixels in the image area being processed, E(i, j), a pixel map of spatial detail layer values forming the spatial detail layer 304, and P(i, j) are P-functions that are inputs to calculating the weighting maps 112.

A P-function for the noise layer 206 may be determined using Equation (2):

$$P_N(i,j)=\exp(-|E(i,j)|/\lambda_N).$$

Parameters denoted as lambdas ($\lambda$) are tuning parameters that are used to change an overall strength of the 3DNR 110 and the ADP 120. For instance, six strength-levels ("strongest", "strong", "medium", "weak", "weakest", and "disabled") may be provided for the 3DNR 110 and the ADP 120, independently. Each strength-level is associated with a set of lambda values and alpha values (which are the on and off rates of the asymmetric IIR). The service provider empirically selects the default lambda values for each strength-level in a way that helps customers meet video quality and bit rate needs. The values associated with 3DNR 110 and ADP 120 may be customized to provide more control. Continuously valued functions may be used to generate the P-functions, provide opportunities for customization, and avoid visual distortions that may arise near the boundaries of the "all-or-none" decisions imposed by threshold operations. The subscript n for the P-function refers to the noise layer 206.

The weighting map 112, W(i,j), includes a value for each pixel based on the model of human temporal perceptibility. After decomposition, the noise layer 206 is recombined with the weighting map 112 to form a modified noise layer 210. The modified noise layer 210 is subtracted from the original picture 124 to produce a cleaned picture 125.

Figure 3:
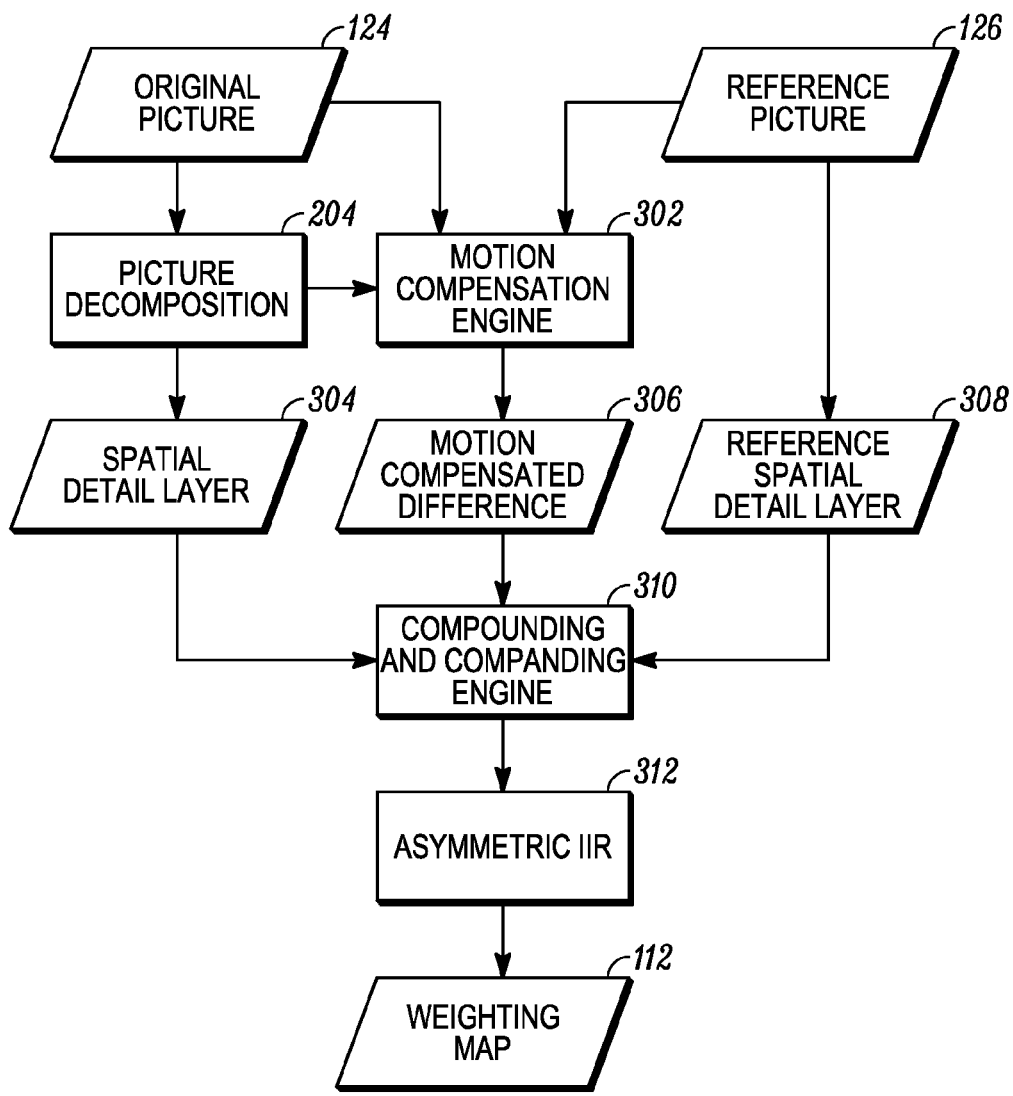
FIG. 3 illustrates perceptual masking and preservation using the 3D noise reducer, according to an embodiment.

The 3DNR 110 may be used for perceptual masking and preservation, as shown with respect to FIG. 3. The P-function for perceptual masking may be determined using Equation (3):

$$P_S(i,j)=\exp(-|E(i,j)|/\lambda_S).$$

Perceptual video identifies parts of vision that human retina sees that are of low impact to perception of image and allows the system 100 to reduce the corresponding low impact parts of image so that there is a reduced amount of data to encode. The subscript s for the P-function refers to the spatial detail layer 304.

As shown in FIG. 3, the original picture 124 may be provided to the picture decomposition 204 to determine the spatial detail layer 304. For instance, the spatial detail layer 304 may be determined using Equation (4):

$$E(i,j)=(Y(i,j)-\overline{Y})-B(i,j),$$

in which Y(i,j) is the pixel map of luma values, and $\overline{Y}$ is a mean value of the pixel map of luma values that may be determined by Equation (5):

$$\overline{Y} = \frac{\sum_{i,j} Y(i,j)}{N}.$$

Luma values represent brightness in an image and are known to be paired with chroma values, which convey color information, to convey an image. B(i,j) is a pixel map of basal layer values. N refers to a total number of pixels in the pixel map.

The basal layer may be determined using Equation (6):

$$B(i,j)=h(k,l)\otimes(Y(i,j)-\overline{Y}),$$

in which h(k,l) is a convolution kernel generated from an IPeG transform.

The original picture 124 along with a reference picture 126 may also be provided to a motion compensation engine 302. The motion compensation engine 302 thereafter determines a motion compensated difference 306 between the original picture 124 and the reference picture 126. For instance, the motion compensation engine 302 may determine motion compensation errors using Equations (7) through (9):

$$D_Y(i,j)=Y(i,j)-Y_{MC}(i,j)$$

$$D_U(i,j)=U(i,j)-U_{MC}(i,j)$$

$$D_V(i,j)=V(i,j)-V_{MC}(i,j)$$

in which U(i,j) and V(I,j) are the pixel maps of chroma values. A P-function for the motion compensation error may be determined using Equation (10):

$$P_D(i,j) = \exp\left(-\sqrt{(|D_Y(i,j)|^2 + a_U \cdot |D_U(i,j)|^2 + a_V \cdot |D_V(i,j)|^2)} / \lambda_S\right).$$

Thereafter, a P-function for the 3DNR 110 may be determined using Equation (11):

$$P_{3DNR}(i,j)=P_D(i,j) \cdot P_S(i,j) \cdot P_{S,REF}(i,j).$$

The motion compensated difference 306, the spatial detail layer 302, and a reference spatial detail layer 308 of the reference picture 126 may all be provided to a compounding and companding engine 310. The result of processing of the picture using the compounding and companding engine 310 may be provided to an Asymmetric (infinite impulse response) IIR 312 with scene-change reset operation.

Thereafter the Asymmetric IIR 312 forms the weighting map 112. The weighting map 112 for the 3DNR 110 may be determined using Equation (12):

$$W_{3DNR}(i,j)=W_{3DNR,REF}(i,j)+\alpha(i,j) \cdot (P_{3DNR}(i,j)-W_{3DNR}(i,j)).$$

α(i, j) for the 3DNR 110 may be determined by the Asymmetric IIR 312 using Equation (13):

$$\alpha(i,j) = \begin{cases} \alpha_{3DNR,ON}; & P_{3DNR}(i,j) > W_{3DNR}(i,j) \\ \alpha_{3DNR,OFF}; & P_{3DNR}(i,j) < W_{3DNR}(i,j) \end{cases}.$$

The motion compensated difference 306 between the original picture 124 and the reference picture 126 may be determined using motion vectors. The motion compensated difference 306 may be determined on a pixel by pixel basis and is used to measure a difference between the original picture 124 and the reference picture 126. Some parts of the difference between the original picture 124 and the reference picture 126 may comprise areas of edges that need to be preserved while other parts may comprise noise that may be removed without affecting perception of the image. The spatial detail layer 304 supplied for the original picture 124 and the reference spatial detail layer 308 supplied for the reference picture 126 are used to identify areas that are not perceptually significant. The weighting map 112 used by the 3DNR 110 combines the spatial layers to reduce noise while preserving perceptually significant details i.e. details that are important from a feature point of view.

For instance, a noise estimate may be determined using Equation (14):

$$\hat{N}(i,j)=[1-b \cdot (1-W_{3DNR}(i,j))] \cdot N(i,j),$$

in which b is a constant. Thereafter the 3DNR 110 may determine a cleaned 3DNR image using Equation (15):

$$Y_{3DNR}(i,j)=Y(i,j)-\hat{N}(i,j).$$

Figure 5:
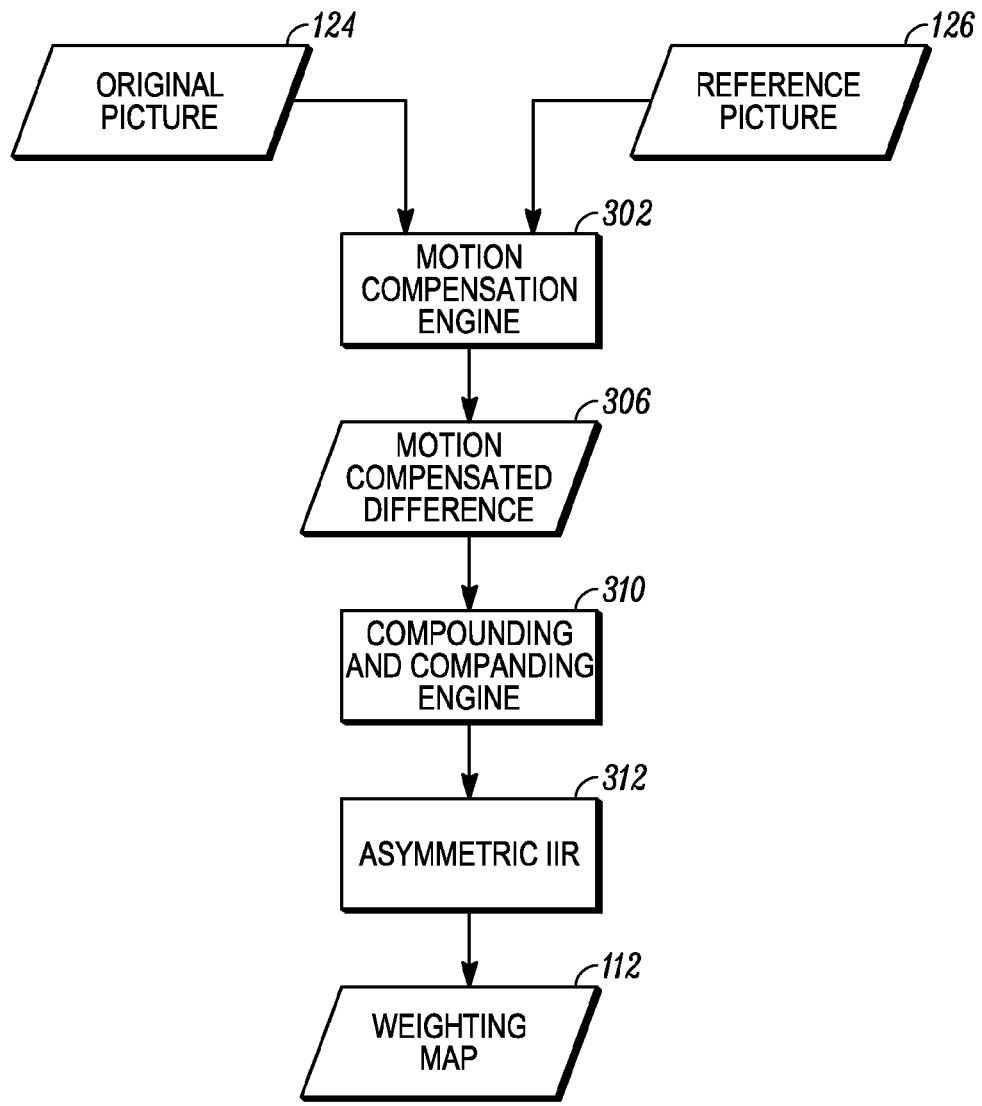
FIG. 5 illustrates perceptual masking and preservation using the adaptive detail reducer, according to an embodiment.

Turning now to FIG. 5, the operation of the ADR 120 is further illustrated. The original picture 124 is decomposed using the picture decomposition 204 into a spatial detail layer 302 and the weighting map 112. The spatial detail layer 406 includes a value for each pixel based on a model of human spatial perceptibility. The weighting map 112 includes a value for each pixel based on a model of human temporal perceptibility. After decomposition, the spatial detail layer 406 is recombined with the weighting map 112 to form a modified detail layer 410. The modified detail layer 410 is subtracted from the original picture 124 to produce a modified picture 426.

The ADR 120 may also be used for perceptual masking and preservation, as shown with respect to FIG. 5. The original picture 124 may be provided to the picture decomposition 204 to determine the spatial detail layer 304. For instance, the ADR 120 may determine a P-function for high-energy spatial detail using Equation (16):

$$P_A(i,j)=1-\exp(-|E(i,j)|/\lambda_A).$$

Similarly, a P-function for difficult-to-track high-energy detail may be determined using Equation (17):

$$P_{ADP}(i,j)=(1-P_D(i,j)) \cdot P_A(i,j).$$

The original picture 124 along with a reference picture 126 may also be provided to the motion compensation engine 302. The motion compensation engine 302 thereafter determines a motion compensated difference 306 between the original picture 124 and the reference picture 126. The motion compensated difference 306 may be provided to a compounding and companding engine 310. The result of processing of the picture using the compounding and companding engine 310 may be provided to an Asymmetric (infinite impulse response) IIR 312 with scene-change reset operation.

Thereafter the Asymmetric IIR 312 forms the weighting map 112. The weighting map 112 for the ADR 120 may be determined using Equation (18):

$$W_{ADP}(i,j) = W_{ADP,REF}(i,j) + \alpha(i,j) \cdot (P_{ADP}(i,j) - W_{ADP}(i,j)).$$

$\alpha(i,j)$ for the ADR 120 may be determined by the Asymmetric IIR 312 using Equation (19):

$$\alpha(i,j) = \begin{cases} \alpha_{ADP,ON}; & P_{3DNR}(i,j) > W_{3DNR}(i,j) \\ \alpha_{ADP,OFF}; & P_{3DNR}(i,j) < W_{3DNR}(i,j) \end{cases}.$$

The reference picture 126 may comprise a previous cleaned picture 125 in the video sequence from the 3DNR 110. Alternately, the reference picture 126 may comprise a previous modified picture 426 in the video sequence from the ADR 120. However, in instances where the previous modified picture 426 is used, a motion mismatch may be introduced that increases spatial detail reduction and adds a second-order temporal dependence. By using the previous cleaned picture 125 in the video sequence from the 3DNR 110, the ADR 120 follows the unpredictable difference between the original picture 124 and the reference picture 126 as closely as possible so that unpredictability is reduced for the encoding process. Use of the previous modified picture 426 as the reference picture 126 effectively introduces an artificial unpredictability.

The ADR 120 may process the original picture 124 to selectively attenuate details that are simultaneously difficult-to-perceive and difficult-to-compress, to preserve important features (e.g., faces, edges), and to avoid blurring. For instance, difficult-to-track high-energy detail may be determined using Equation (20):

$$\hat{S}(i,j) = W_{ADP}(i,j) \cdot E(i,j).$$

Thereafter the ADR 120 may determine an ADP image using Equation (21):

$$Y_{ADP}(i,j) = Y(i,j) - \hat{S}(i,j).$$

Increased compression efficiency improvement on high-energy background motion, e.g. up to 50%, may preferably be obtained. The ADR 120 subtracts the unpredictable high-energy detail from the original picture 124. More specifically, the ADR 120 extracts a spatial detail layer, accounts for perceptual masking and may be used to avoid blurring. The ADR 120 uses the spatial layers and temporal error layers, which may be created through motion estimation, to perform perceptual masking and preservation. The ADR 120 may determine a number from zero to one for each pixel in the layers and overlay the spatial layers and temporal error layers, using different areas to do different types of processing.

The ADR 120 uses the motion compensated difference 306 in the compounding and companding engine 310 to map an absence of difference in the temporal error layer for each pixel using a weighting function. The motion compensated difference 306 at a motion estimation stage may range from one to 255, with a size of difference indicating whether a pixel is a candidate for a poor prediction. The weighting function may comprise P-function maps that indicate a range from a relatively good prediction to a relatively bad prediction on a scale of zero to one for the motion compensated difference 306. Small errors map linearly to the P-function maps, while large errors non-linearly to the P-function maps.

The motion compensated difference 306 is determined in a range of values from zero to one on a compression scale by the compounding and companding engine 310. The compounding and companding engine 310 uses a non-linear companding scale and adds to two other P-functions. Each of the P-functions indicates parts of the original picture 124 that tend to be of high significance and easily tracked and parts of the reference picture 126 that tend to be of high significance and easily tracked as still images. The two images are multiplied together and used to map areas of the difference map where there is a higher probability of inaccurate prediction. The resulting weighting map 112 is a composite map that ranges from near zero when details are easy to track and easily predicted to one when details are either not easy to track, not easily predicted or a combination of not easy to track and not easily predicted. The weighting map 112 may be used to highlight areas which are of low perceptual significance and probably poorly predicted.

Example of methods in which the system 100 may be employed for reducing noise in video processing now be described with respect to the following flow diagram of the methods 600 to 740 depicted in FIGS. 6 to 7E. It should be apparent to those of ordinary skill in the art that the methods 600 to 740 represent generalized illustrations and that other steps may be added or existing steps may be removed, modified or rearranged without departing from the scopes of the methods 600 to 740. In addition, the methods 600 to 740 are described with respect to the system 100 by way of example and not limitation, and the methods 600 to 740 may be used in other systems.

Some or all of the operations set forth in the methods 600 to 740 may be contained as one or more computer programs stored in any desired computer readable medium and executed by a processor on a computer system as described with respect to FIGS. 1-5. Exemplary computer readable media that may be used to store software operable to implement the present invention include but are not limited to conventional computer system RAM, ROM, EPROM, EEPROM, hard disks, or other data storage devices.

Figure 6:
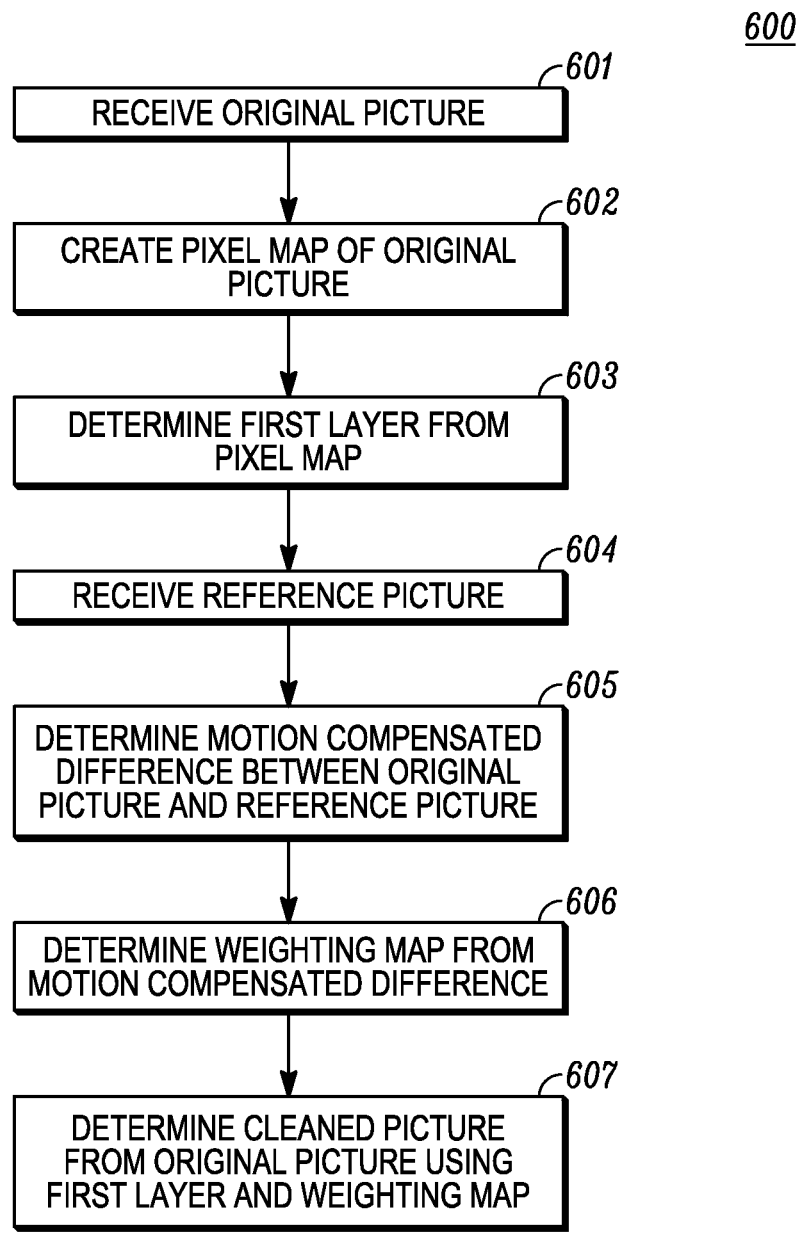
FIG. 6 illustrates a flow diagram of a method of reducing noise in video processing, according to an embodiment.

At step 601, as shown in FIG. 6, the system 100 receives an original picture 124 at the input module 102 of the system 100. For instance, the original picture 124 may be a picture in a video sequence processed by a service provider, while the system 100 may compromise an encoding system in a cable head end.

At step 602, the system 100 creates a pixel map using a model human visual system and the picture decomposition 204. For instance, the original picture 124 may be represented in dual form as an IPEG signal using an IPEG system for the model human visual system and performing an IPEG decomposition using the picture decomposition 204. The system 100 creates the pixel map in a parallel model. The original picture 124 is mapped pixel by pixel as it would be mapped in a human retina. The IPEG decomposition stratifies the mapped original picture 124 in terms of high perceptual detail features and low perceptual detail features.

At step 603, the system 100 determines a first layer from the pixel map using the picture decomposition 204. According to an embodiment, the first layer is a noise layer 206 determined by the system 100 using the 3DNR 110. The noise layer 206 includes a value for each pixel based on the model human visual system. For instance, parts of the mapped original picture 124 that are low perceptual detail features and cannot be predicted to a predetermined level of accuracy through motion compensation become candidates for noise. Parts of the original picture 124 where motion cannot be predicted to the predetermined level of accuracy will be difficult-to-compress. The difficult-to-compress may be determined based on a predetermined scale or on a relative basis with regard to other parts of the original picture 124.

According to another embodiment, the first layer is a spatial detail layer 406 determined by the system 100 using the ADR 120. The spatial detail layer 406 includes a value for each pixel based on a model of human spatial perceptibility.

At step 604, the input module 102 receives a reference picture 126. According to an embodiment, the reference picture 126 may comprise a previously cleaned picture 125 in the video sequence from the 3DNR 110. According to another embodiment, the reference picture 126 may comprise a previously modified picture 426 in the sequence from the ADR 120.

At step 605, the system 100 determines a motion compensated difference 306 between the original picture 124 and the reference picture 126. For instance, the system 100 may determine the motion compensated difference 306 using a motion compensation engine 302.

At step 606, the system 100 determines a weighting map 112 from the motion compensated difference between the original picture 124 and the reference picture 126. For instance, the system 100 may create the weighting map 112 using a scale of zero to one representing whether energy in a part of the picture is likely to be due to noise or something that can be perceived and compressed easily.

At step 607, the system 100 determines a processed picture from the original picture 124 using the weighting map 112 and the first layer. According to an embodiment, the determined processed picture is a cleaned picture 125 and the first layer used to determine the cleaned picture 125 is a noise layer. The system 100, more particularly the 3DNR 110, forms a modified noise layer 210 using the noise layer 206 and the weighting map 112. The 3DNR 110 includes a value for each pixel in the modified noise layer 210 based on a model of human perceptibility. The 3DNR 110 determines the cleaned picture 125 by subtracting pixels in the modified noise layer 210 from pixels in the original picture to eliminate data that is difficult-to-compress and difficult-to-perceive.

Through use of additional processing, as described hereinbelow with respect to FIGS. 7A to 7E, and the methods 700 to 740, the 3DNR 110 may increase the accuracy and effectiveness of the noise reduction. Additional processing may be used for the original picture 124, the spatial detail layer 304, the reference picture 126 and the reference spatial detail layer 308. The methods disclosed in FIGS. 7A to 7E are illustrative and it will be apparent to one of ordinary skill in the art that other combinations of processing may be used by the 3DNR 110.

Figure 7A:
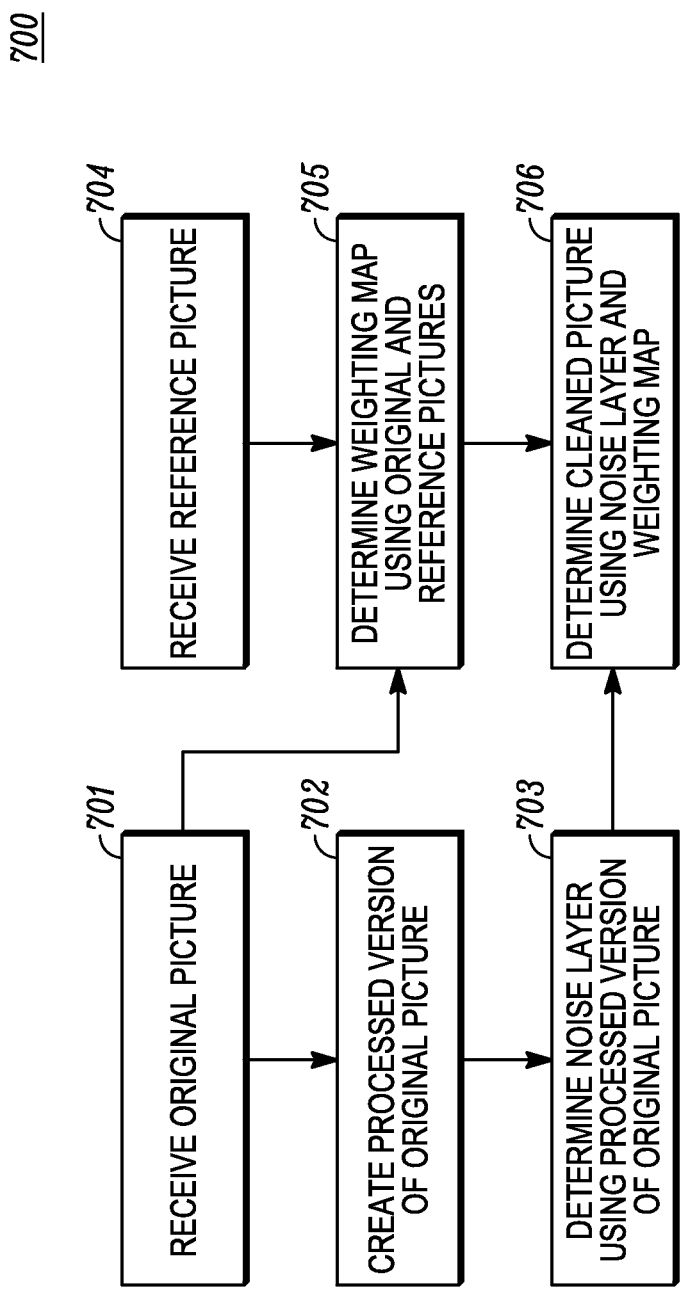
FIG. 7A illustrates determining a cleaned picture using the 3D noise reducer, according to an embodiment.

At step 701 of the method 700, as shown in FIG. 7A, the original picture 124 is received. For instance, the original picture 124 may be received at the input module 102 of the system 100. The 3DNR 110 then creates a processed version of the original picture 124 at step 702. The processed version of the original picture 124 produces smoother, more natural motion data for motion compensation. The processed version of the original picture 124 may be a softened or blurred version of the original image. According to an embodiment, the processed version of the original picture 124 is the original picture 124 minus the spatial detail layer 304. The processed version of the original picture 124 may alternately be described as a basal layer, as defined hereinabove with respect to Equation (6).

At step 703, the noise layer 210 may be determined using the processed version of the original picture 124.

At step 704, the reference picture 126 is received. The reference picture 126 may comprise a previously cleaned picture 124 in the video sequence. Thereafter at step 705 the 3DNR 110 determines the weighting map 112 using the original picture 124, and the reference picture 126. For instance, the original picture may be processed as a pixel map based on a model human visual system.

At step 706, the cleaned picture 125 is determined using the noise layer 210 and the weighting map 112. For instance, the 3DNR 110 may determine a modified noise layer using the noise layer 210 and the weighting map 112. Thereafter, the modified noise layer may be subtracted from the original picture 124 to form the cleaned picture 125

Figure 7B:
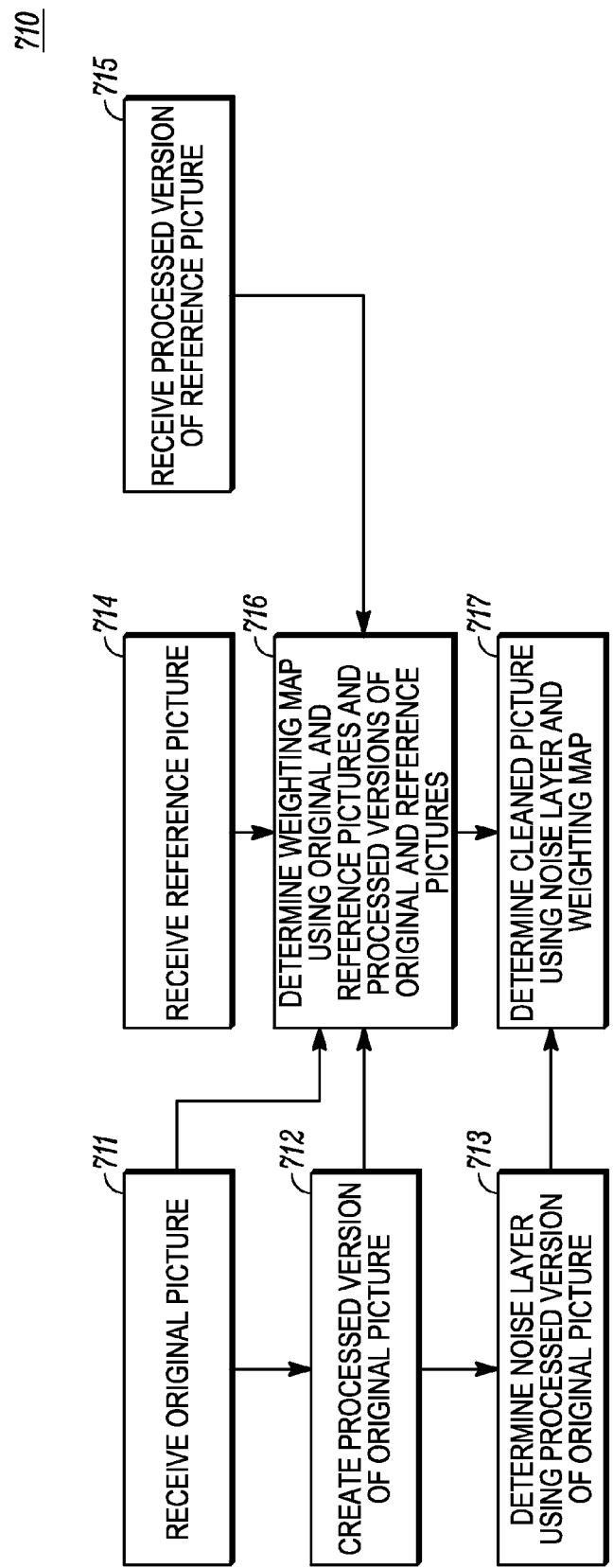
FIG. 7B illustrates determining a cleaned picture using the 3D noise reducer, according to an embodiment.

Turning now to the method 710 as shown in FIG. 7B, there is shown a similar method to the method 700. Steps 711 to 713 of the method 710 are the same as steps 701 to 703 of the method 700 shown in FIG. 7A. In addition, step 717 of the method 710 corresponds to step 706 of the method 710.

However, at step 714 of the method 710, the reference picture 126 is received. At step 715, a processed version of the reference picture 126 may be received. Steps 711, 714 and 715 may occur simultaneously or in any consecutive order. The processed version of the reference picture 126 may have been previously processed by the 3DNR 110. Thereafter at step 716 the 3DNR 110 determines the weighting map 112 using the original picture 124, the reference picture 126, the processed version of the original picture 124, and the processed version of the reference picture 126.

Figure 7C:
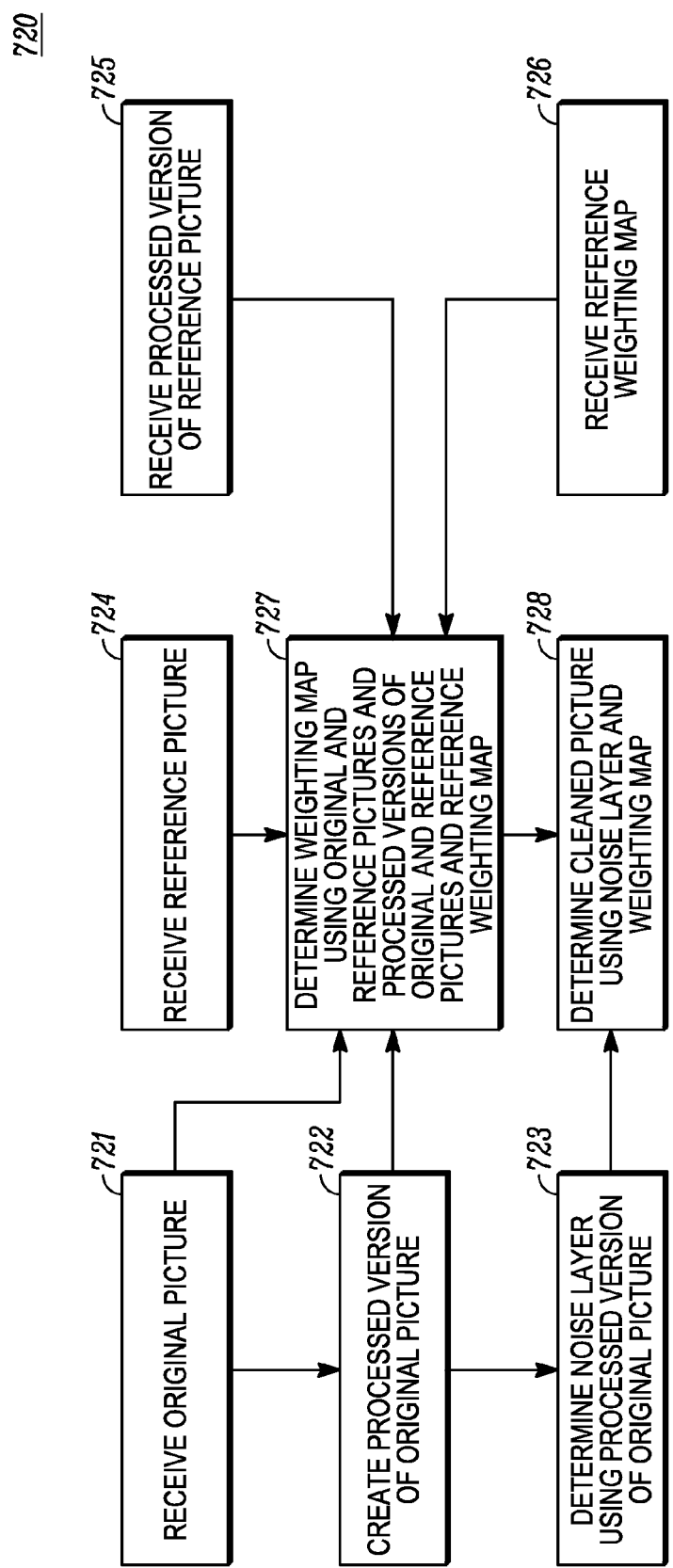
FIG. 7C illustrates determining a cleaned picture using the 3D noise reducer, according to an embodiment.

Turning now to the method 720 as shown in FIG. 7C, there is shown a similar method to the method 710 with corresponding steps as shown in FIG. 7B. However, at step 726 of the method 720, a reference weighting map (not previously shown) is received. The reference weighting map may have been previously processed by the 3DNR 110. Steps 721, 724, 725 and 726 may occur simultaneously or in any consecutive order. Thereafter at step 727 the 3DNR 110 determines the weighting map 112 using the original picture 124, the reference picture 126, the processed version of the original picture 124, the processed version of the reference picture 126, and the reference weighting map.

Figure 7D:
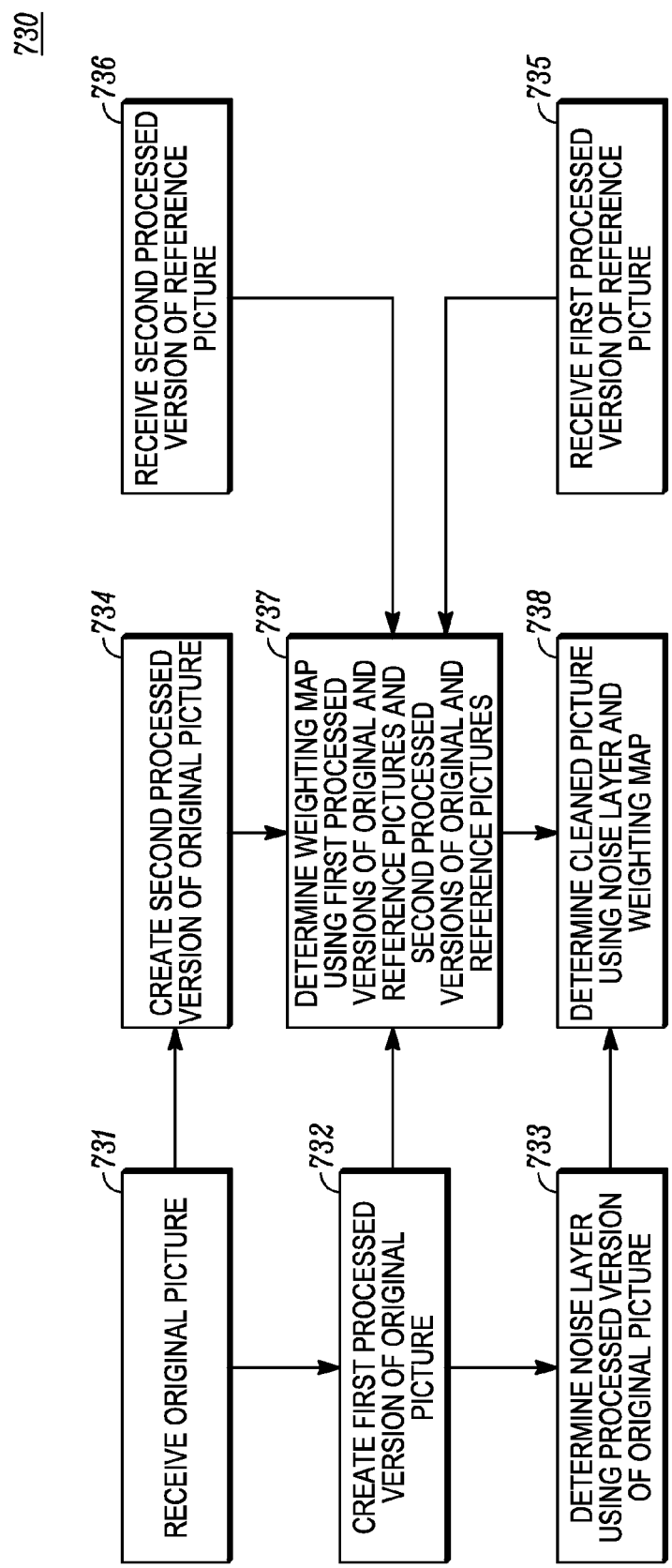
FIG. 7D illustrates determining a cleaned picture using the 3D noise reducer, according to an embodiment.

Turning now to the method 730, as shown in FIG. 7D, there is shown a similar method to the method 710 with corresponding steps as shown in FIG. 7B. Additionally, at step 734 of the method 730, the 3DNR 110 creates a second processed version of the original picture 124. For instance, the second processed version of the original picture 124 may be created using the processed version of the original picture 124 resulting from step 732.

At step 735, a processed version of the reference picture 126 is received. Thereafter at step 736, a second processed version of the original picture is received. For instance, the second processed version of the reference picture 126 may be created using the processed version of the original picture 124 received at step 734.

Thereafter at step 737 the 3DNR 110 determines the weighting map 112 using the processed version of the original picture 124, the second processed version of the original picture 124, the processed version of the reference picture 126, and the second processed version of the reference picture 126.

Figure 7E:
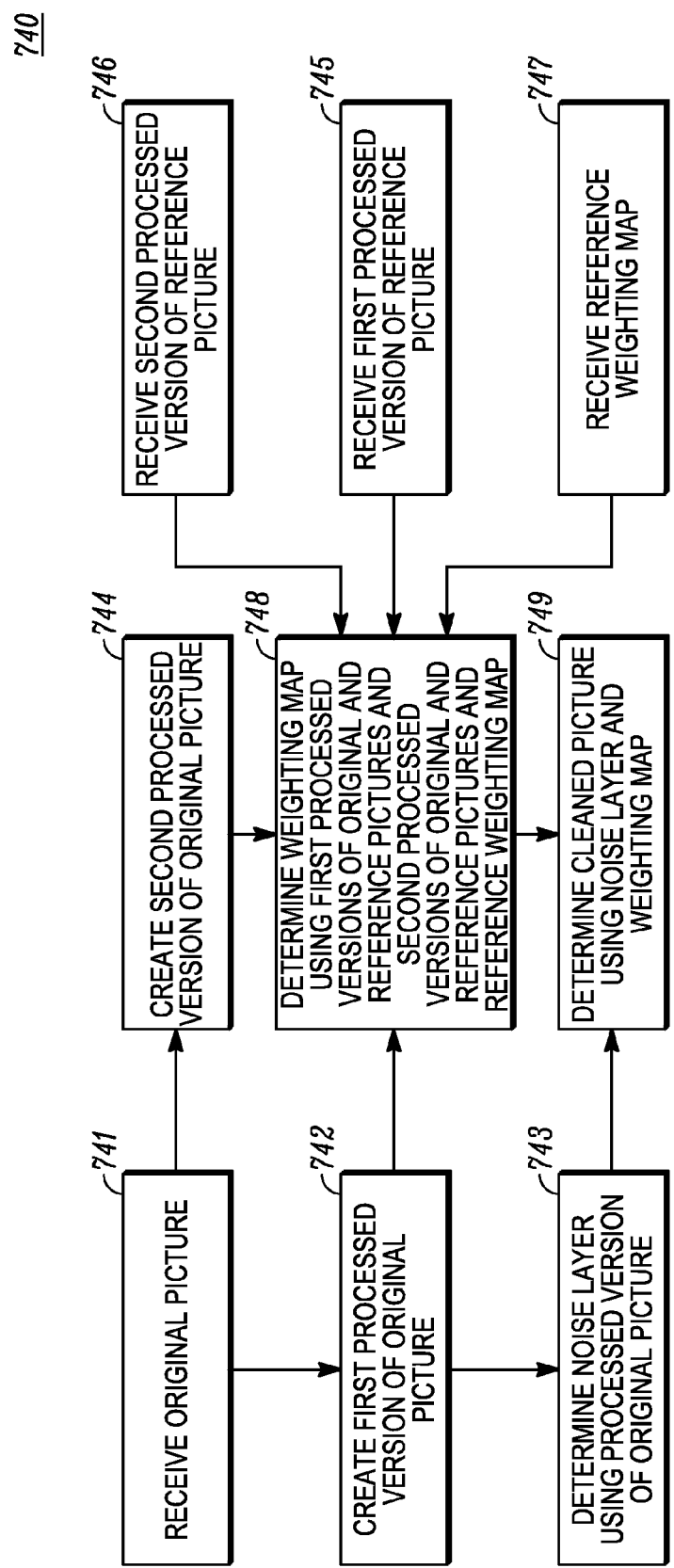
FIG. 7E illustrates determining a cleaned picture using the 3D noise reducer, according to an embodiment.

Turning now to the method 740, as shown in FIG. 7E, there is shown a similar method to the method 730 with corresponding steps as shown in FIG. 7D. Additionally, at step 747 of the method 740, a reference weighting map is received. The reference weighting map may thereafter be used in determining the weighting map 112 at step 748.

Embodiments of the present invention provide auto adapting noise reduction and adaptive detail reduction functions for an encoding system. The embodiments of the invention may operate as either a stand-alone pre-processor or be coupled to the encoding engine. The embodiments of the invention combine both noise layer and a weighting map to find pixels that are difficult-to-compress and difficult-to-perceive and then reduces the energy of those pixels making video images easier to encode. Consequently, there are less bits to compress and transmit.

While the embodiments have been described with reference to examples, those skilled in the art will be able to make various modifications to the described embodiments without departing from the true spirit and scope. The terms and descriptions used herein are set forth by way of illustration only and are not meant as limitations. In particular, although the methods have been described by examples, steps of the methods may be performed in different orders than illustrated or simultaneously. Those skilled in the art will recognize that these and other variations are possible within the spirit and scope as defined in the following claims and their equivalents.

What is claimed is:

1. A system for reducing noise in video processing, the system comprising:
    a data storage configured to store a model human visual system;
    an input module configured to receive an original picture in a video sequence and to receive a reference picture in the video sequence;
    a processor configured to:
        create a pixel map of the original picture using the model human visual system;
        determine a first layer from the pixel map using the model human visual system;
        determine a motion compensated difference between the original picture and the reference picture,
        determine a weighting map from the motion compensated difference between the original picture and the reference picture, wherein the weighting map includes a value for each pixel based on a model of human temporal perceptibility; and
        determine a processed picture from the original picture by recombining the first layer with the weighting map,
    wherein the first layer goes beyond a noise layer that includes additive noise and is made up of a spatial detail layer including a value for each pixel based on a model of human spatial perceptibility, and
    wherein a three dimensional noise reducer (3DNR) process precedes an adaptive detail reducer (ADR) process, and wherein the 3DNR performs three dimensional noise reduction on the original picture in two spatial dimensions and a temporal dimension, and the ADR process performs adaptive detail reduction on the original picture on selected difficult-to-track details.

2. The system of claim 1, wherein the difficult-to-track details in the original picture may be reduced using the weighting map and the ADR to form the processed picture 130.

3. The system of claim 2, wherein the difficult-to-track details may be determined using a predetermined threshold based on the weighting map.

4. The system of claim 3, wherein the model human visual system takes into account statistics of natural images and a response function of cells in a retina.

5. The system of claim 4, wherein an asymmetric (infinite impulse response) IIR is used determine the weighting map.

6. A system for reducing noise in video processing, the system comprising:
    a data storage configured to store a model human visual system;
    an input module configured to receive an original picture in a video sequence and to receive a reference picture in the video sequence;
    a processor configured to:
        create a pixel map of the original picture using the model human visual system;
        determine a first layer from the pixel map using the model human visual system;
        determine a motion compensated difference between the original picture and the reference picture,
        determine a weighting map from the motion compensated difference between the original picture and the reference picture, wherein the weighting map includes a value for each pixel based on a model of human temporal perceptibility; and
        determine a processed picture from the original picture by recombining the first layer with the weighting map,
    wherein the first layer goes beyond a noise layer that includes additive noise and is made up of a spatial detail layer including a value for each pixel based on a model of human spatial perceptibility, and
    wherein an asymmetric (infinite impulse response) IIR is used determine the weighting map.

* * * * *